Nov. 23, 1965 A. SAMMS 3,218,974
AIR BREATHING BOOSTER
Filed March 24, 1964 3 Sheets-Sheet 1
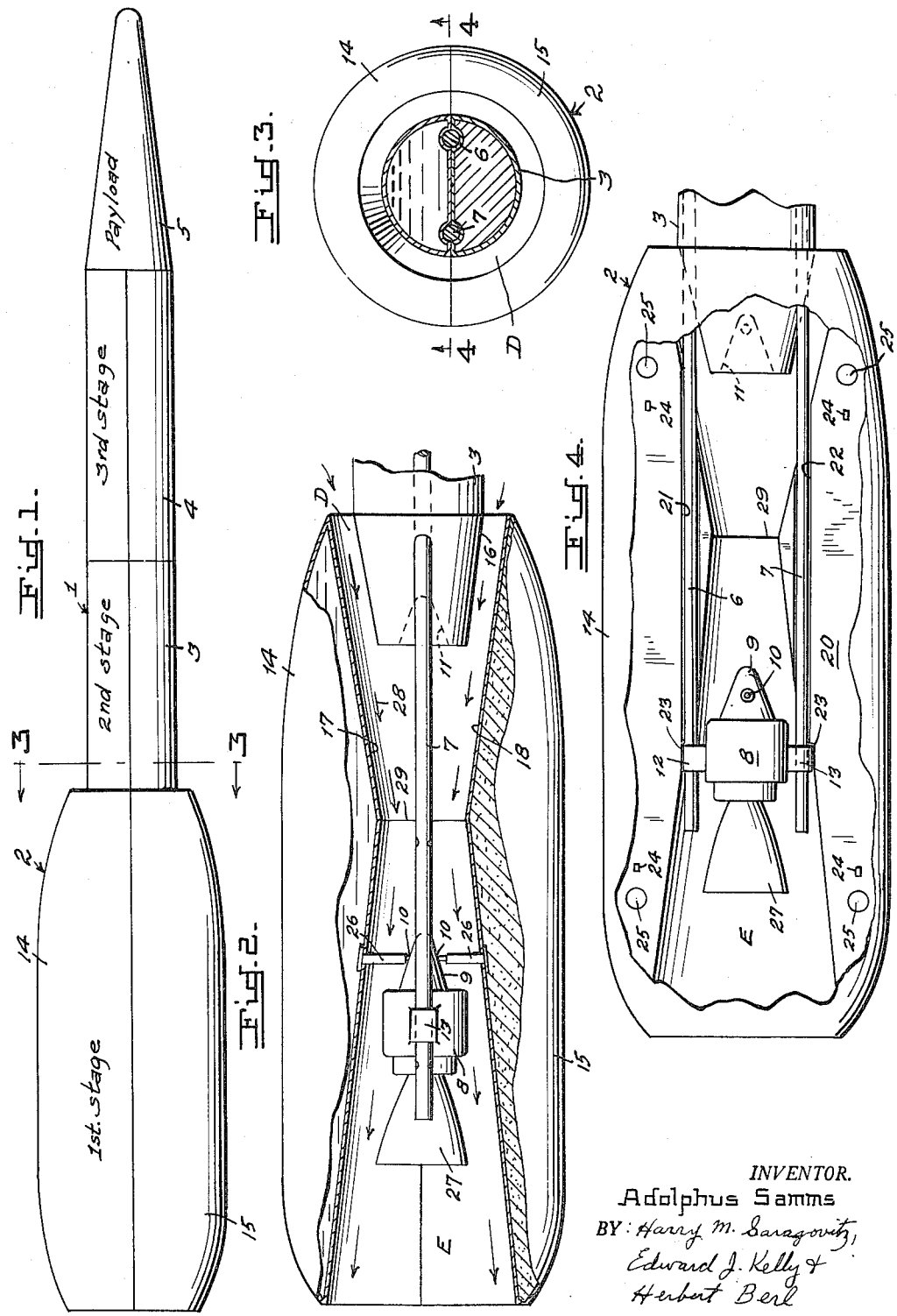
INVENTOR.
Adolphus Samms
BY: Harry M. Saragovitz,
Edward J. Kelly &
Herbert Berl Nov. 23, 1965     A. SAMMS     3,218,974
AIR BREATHING BOOSTER
Filed March 24, 1964     3 Sheets-Sheet 2
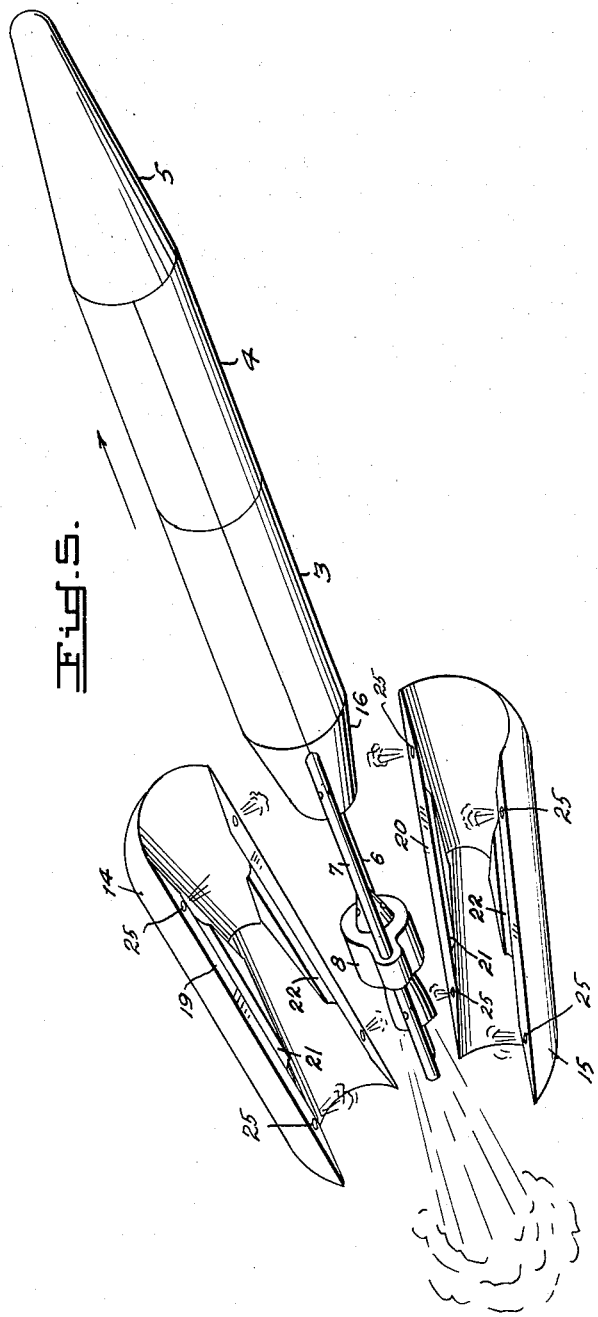
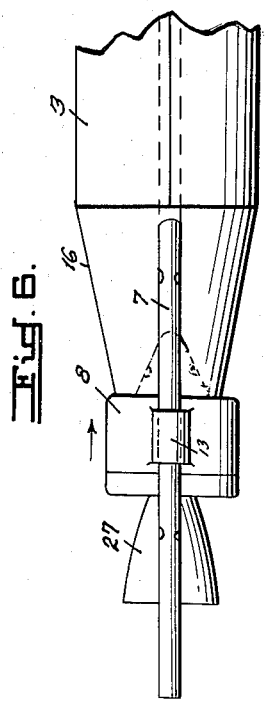
INVENTOR.
Adolphus Samms
BY: Harry M. Saragovitz
Edward J. Kelly &
Herbert Berl

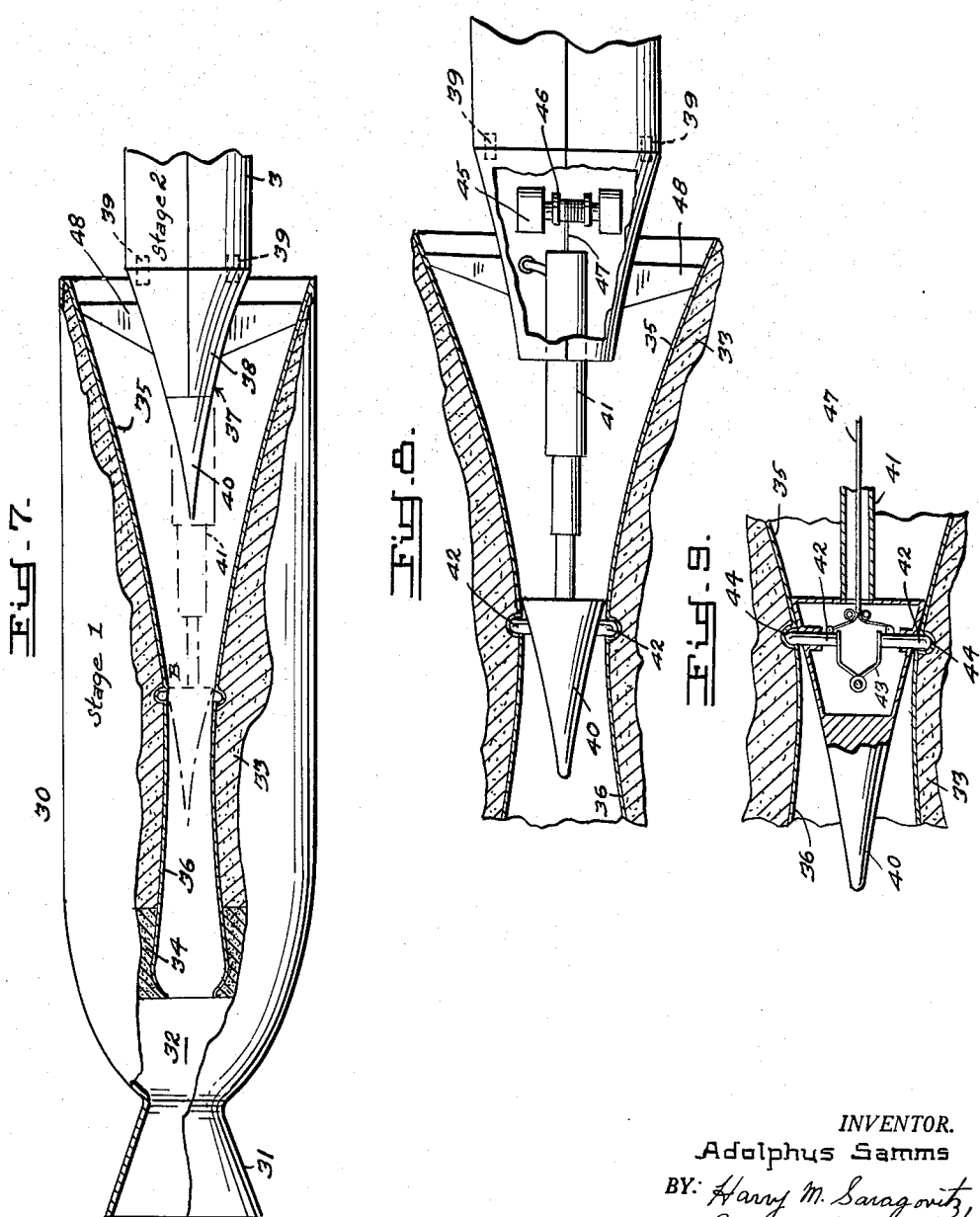

United States Patent Office 3,218,974
Patented Nov. 23, 1965

3,218,974
AIR BREATHING BOOSTER
Adolphus Samms, Box 270, U.S. Army Garrison,
Yuma Test Station, Ariz.
Filed Mar. 24, 1964, Ser. No. 354,482
2 Claims. (Cl. 102—49)
(Granted under Title 35, U.S. Code (1952), sec. 266)

The invention described herein may be manufactured and used by or for the Government for governmental purposes, without the payment to me of any royalty thereon.

This invention relates to an air breathing booster for a rocket and more particularly to a booster used to augment the blast-off and initial flight of a multi-stage rocket.

At present, space vehicles are launched into space by use of large multi-stage rockets employing solid and/or liquid propellants.

Regardless of the type propellant used, highly effective specific impulse, or thrust, of the rocket is most important and is obtained by the use of oxygen from the atmosphere to increase the efficiency of the fuel combustion and to increase the rocket's thrust.

This invention uses what is termed by rocket personnel the "athodyd" principle for the thrust augmentation of the rocket and is applied to the main booster which constitutes the first stage of the multi-stage rocket and consists of enclosing the combustion chamber in a shroud containing the fuel and oxidizer, or the solid propellant.

The "anthodyd" type rocket has one disadvantage in that it requires initial velocity, and therefore must be launched by a suitable launcher.

The present invention overcomes this disadvantage by providing an axial air inlet passageway extending rearwardly through the booster.

The inlet passageway forms a tube having a convergent, divergent configuration and its forward opening is of larger diameter than the diameter of the succeeding stages of the rocket so that when the rocket engine is ignited, the rocket begins its upward lift and air is forced into the forward end of the passageway and then flows to the mixing chamber of the rocket where it is mixed with hot combustion gases and is expanded to give additional thrust to the rocket without the need of extra fuel usually required to provide this additional thrust.

When the fuel and oxidizer in the booster is exhausted the tank, or tanks, are jettisoned by means provided in the rocket's mechanism.

Each kilogram of air taken from the atmosphere replaces extra propellant otherwise required to launch the rocket from the ground and to propel it through its initial flight phase.

It is therefore a primary object of this invention to provide a cheaper and more flexible means to lift large pay load masses into satellite orbits and to escape trajectories without the need for carrying the weight of extra boosting propellants.

It is another object to provide a multi-stage rocket employing the main booster of the rocket as the first stage of flight.

Still another object is to keep the nozzle area of a rocket engine especially at the outlet thereof, cool by countering the heat of combustion.

A further object is to provide a booster shroud adapted for use with rockets employing both liquid and/or solid propellants.

It is a final object of this invention to provide a rocket booster incorporating air breathing to increase its thrust in its initial flight stage.

The specific nature of the invention, as well as other objects and advantages thereof, will clearly appear from a description of a preferred embodiment as shown in which:

FIG. 1 is a side elevation of the air breathing booster of the invention and attached to a multi-stage rocket;

FIG. 2 is an enlarged side view of the booster with the tanks broken away to show the central port and rocket motor therein;

FIG. 3 is a cross section view taken along lines 3—3 of FIG. 1;

FIG. 4 is a view similar to FIG. 2 but rotated at an angle of 90° thereto;

FIG. 5 is a perspective view of a rocket in flight and the booster tanks being jettisoned;

FIG. 6 is a fragmentary view of the rocket motor's position after jettison of the booster tanks;

FIG. 7 is a side elevation of a modified type booster using a solid propellant and employing a diffuser, the dotted lines showing the position of the diffuser after the rocket becomes airborne;

FIG. 8 is a fragmentary view showing the mechanism for moving the diffuser into the position as shown in dotted lines in FIG. 7, and FIG. 9 is a fragmentary view, and in section, showing the means for locking the diffuser in the position shown in FIG. 9, this view being drawn to a larger scale.

Referring now to the drawings wherein reference character 1 denotes generally a multi-stage air frame rocket and is essentially of the construction shown in U.S. Patent No. 3,048,107 in which the rocket combustion chamber slides along a frame to be connected to each succeeding stage for refining after the preceding stage fuel tanks have been jettisoned. While the present invention is especially adaptable for this type rocket, it may also be modified to be used for other types of rockets as will become apparent later.

The air breather booster of the invention is indicated generally by 2 and, as will be observed from FIG. 1, replaces stage 1, the remaining stages of the air frame rocket being indicated by 3 (Stage 2) and 4 (Stage 3); the payload being indicated by 5. The air frame consists of two rods 6 and 7, and the combustion chamber is indicated generally by 8 and includes a conical connector 9 with ports 10. The conical connector slides into a conical recess 11 in Stage 2, reference 3, upon jettison of the booster 2, where it is connected to the fuel tanks in that stage. Lugs 12 and 13 receive rods 6 and 7 to support combustion chamber 8.

As best seen in FIG. 2 the air breather booster 2 consists of a pair of semicircular propellant tanks 14 and 15, just as does Stages 2 and 3 of the rocket 1, which contain the fuel and oxidizer respectively.

The rearward end of the second stage 3 of rocket 1 is tapered rearwardly as at 16 and acts as a diffuser.

Each tank 14 and 15 is provided with an axially disposed semicircular groove 17 and 18 respectively. When the tanks 14 and 15 are connected together, there is formed an axial passageway converging from a diameter greater than the diameter of the second stage 3 to an area rearwardly within the booster and then diverges rearwardly to a diameter within the rearward portion of the booster that is greater than the diameter of the combustion chamber 8.

The tanks 14 and 15 are provided with planar inner faces 19 and 20 (see FIG. 5). These faces are identical and each face 19 and 20 is provided with a semicircular longitudinal groove 21 and 22 for receiving rods 6 and 7 respectively therein. A notch is formed at the rearward end of each longitudinal groove 21 and 22 providing a shoulder 23 to abut lugs 12 and 13 on combustion chamber 8 and prevent its forward travel when the booster is assembled.

Suitable means are provided to lock the tank halves 14 and 15 together when in assembled condition on rocket 1 and these means are similar to the locking means in U.S. Patent 3,048,107 and are designated by 24.

Explosive charges 25, electrically fired, are provided to jettison the tanks 14 and 15 when their fuel is exhausted, the electrical firing means not being shown.

Means for feeding the fuel and oxidizer in tanks 14 and 15 to combustion chamber 8 are provided and may consist of a tube 26 leading from each tank and connected to ports 10 in any manner expedient.

It will be observed from FIG. 2 that arrows 28 indicate the flow of air in the passageway and the air enters at area D and flows rearwardly therethrough to mix with hot combustion gases from nozzle 27 in mixing chamber E.

The operation of the invention is as follows: After the rocket engine has been started, fuel and oxidizer will be fed through tubes 26 into combustion chamber 8. The rocket then begins its flight carrying the booster 2 with it. Air is forced through opening 17, 18 at D and passes around the diffuser portion 16 and combustion chamber 8 as indicated by arrows 28 to mix with hot combustion gases at E from nozzle 27 of chamber 8, to provide additional thrust to the rocket.

The air will tend to become somewhat compressed at the smallest diameter 29 of opening 17, 18 and will be fed at a somewhat lower rate to the rearward portion of the opening. The size of the diameter 29 may be regulated to provide the right amount of air flow to the mixing chamber E.

When the fuel and oxidizer in tanks 14 and 15 become exhausted, the tanks are jettisoned by electrical means (not shown) which fire explosive charges 25 as depicted in FIG. 5. The combustion chamber 8 now slides forwardly along rods 6 and 7 to its position shown in FIG. 6 where it becomes connected to the fuel tanks in the second stage 3, the conical connector entering conical recess 11 therein. Ports 10 are connected to ports in recess 11 as described and shown in U.S. Patent No. 3,048,107. Tubes 26 are pulled off ports 10 during the jettison, and valves controlling the opening and closing of ports 10 and similar ports in recess 11 as is also described and shown in the aforesaid patent.

Thus the combustion chamber 8 becomes refueled. The operation is, of course, similar for each stage of flight.

The method of jettisoning the tanks could also be accomplished by explosive bolts connecting the booster to the second stage of the rocket if desired, and especially as in case a rocket of conventional design is used, and also if instead of using divided tanks as shown, a single tank containing a solid propellant is used as the booster. Such a modified form is shown in FIGS. 7–9 wherein a means to regulate the diffuser is shown.

The tank 30 is of one-piece construction and has a nozzle 31 and a combustion chamber 32.

Tank 30 contains a solid propellant charge 33 and a rich mixture of fuel and oxidizer 34 at the rear of charge 33 and this tank constitutes Stage 1 of the rocket.

Tank 30 has an axially disposed passageway 35 which converges to a smaller diameter towards the center of the tank and then diverges to a larger diameter towards the rearward portion of the tank as at 36.

A tapered diffuser is indicated generally by 37 and is attached at its forward portion 38 to the rear end of stage 2 by explosive bolts, indicated by dotted lines as at 39.

The rearward portion 40 of the diffuser is separate from the forward portion and is connected at its forward end to a telescopic rod 41 which moves the rearward section rearward as seen in FIG. 8. This rod may be operated hydraulically or by any other expedient means (not shown).

Means for locking diffuser 37 in its rearward position are housed in diffuser 37 and are illustrated in FIG. 9 and consists of a pair of detent pins 42 biased in diametrically opposite directions by a spring 43. Pins 42 fit into recesses 44 in the wall of inlet port 35.

Means for unlocking the diffuser 37 are provided and consist of an electrical motor 45 or other suitable motive power. This motor drives a reel 46 which is adapted to wind up a cable 47 attached at its other end to pins 42.

The booster 30 may be attached to second stage 3 by fin-like supports 48.

The operation of the modified form is as follows:

A suitable igniter (not shown) may be used to ignite the rich charge 34 (which is an unrestricted, burning charge). The high pressure gases formed by combustion of the rich charge 34 is prevented from escaping out of forward end of booster 30 by the diffuser 37, held in the position shown in FIG. 7.

Once the booster 30 has developed thrust and becomes airborne, and the velocity increases, the pressure of the incoming air at the forward end of the inlet port increases and develops a pressure barrier at B (see FIG. 7).

The diffuser sections 38 and 40 may be designed for operation at a given air entrance velocity or predetermined ram air speed.

The rearward section 40 of diffuser 37 is now moved rearwardly by telescopic rod 41 (see FIG. 8) until pins 42 snap into recesses 44 under bias of spring 43 and lock the section 40 in the position shown in FIG. 8.

The gas pressure at B can now reach combustion chamber 32 and increase the rocket's thrust.

After charge 34 reaches charge 33 the motor 45 is caused to be energized to rotate reel 46 and pull cable 47 to release pins 42 and pull section 40 of the diffuser back to section 38 and air is again admitted to inlet port 35 and the booster becomes an air breathing booster.

When charge 33 is exhausted, explosive bolts 39 are exploded by electrical means (not shown) and the booster tank 30 is jettisoned.

The advantage of this system is that the solid propellant booster 30 becomes an air breathing booster during the early stages of flight, from lift off up through the atmosphere and oxygen from the air will be added for combustion to increase and control the rocket's propulsion.

Variations and modifications may be effected without departing from the scope of the novel concept of the present invention as set forth in the appended claims.

What is claimed is:

1. An air breather booster for attachment to the second stage of a multiple stage rocket and constituting the first stage thereof, said rocket including a rearwardly tapering diffuser attached to the rearward end of the second stage and a combustion chamber spaced axially and rearwardly of said diffuser; said booster comprising a cylindrical tank containing a propellant, there being an axial passageway extending therethrough; said passageway having a forward portion flaring forwardly to a diameter greater than the outer diameter of said second stage of said rocket whereby there is formed an annular space between the peripheral wall of said forward portion of said passageway and said second stage, said forward portion of said passageway converging rearwardly towards the center of said passageway, then diverging rearwardly; said rearwardly tapering diffuser comprising a forward section secured to said second stage of said rocket, a rearward section, a telescopic rod mounted in said forward section and attached to said rearward section whereby said rearward section may be extended rearwardly to the smallest diameter of said passageway and block said opening; a means for locking said rearward section in said rearward extended position; means housed in said forward section for unlocking and retracting said rearward section; and means for jettisoning said booster and said diffuser from said second stage when said booster is burned out.

2. An air breather booster as claimed in claim 1 wherein said means for locking said rearward section in its rearward extended position in said passageway comprises a pair of diametrically disposed recesses adjacent the smallest diameter of said passageway, a pair of spring biased, diametrically disposed pins in said rearward section adapted to snap into said recesses, a motor in said forward section, a reel rotated by said motor and a cable attached to said pins and adapted to be wound on said reel when said motor is energized and pull said pins out of said recesses and pull said rearward section back to said forward section.

References Cited by the Examiner

UNITED STATES PATENTS

| | | | |
|---|---|---|---|
| 2,684,570 | 7/1954 | Nordfors | 60—35.6 |
| 2,686,473 | 8/1954 | Vogel | 102—49 |
| 3,038,408 | 6/1962 | Kluge | 60—35.6 |
| 3,048,107 | 8/1962 | Samms | 102—49 |
| 3,063,240 | 11/1962 | Ledwith | 102—49 |
| 3,115,008 | 12/1963 | Cohen et al. | 60—35.6 |

BENJAMIN A. BORCHELT, *Primary Examiner.*